L. Hall.

Eyeletting Machine.

No. 2962 Reissued Jun. 2, 1868.

Witnesses.

E. M. Stevens

F. Johnson

Inventor Luther Hall (3 Sheets) Sheet 2.

L. Hall
Eyeletting Machine.

No. 2962 Reissued Jun. 2, 1868

Witnesses
H. L. Jones
Henry J. Hunson.

W. N. Ely, Assignee
of Luther Hall Inventor
by Dodge & Munn
Attorneys.

(3 Sheets) Sheet 3.
L. Hall
Eyeletting Machine.
No. 2962 Reissued Jun. 2, 1868.
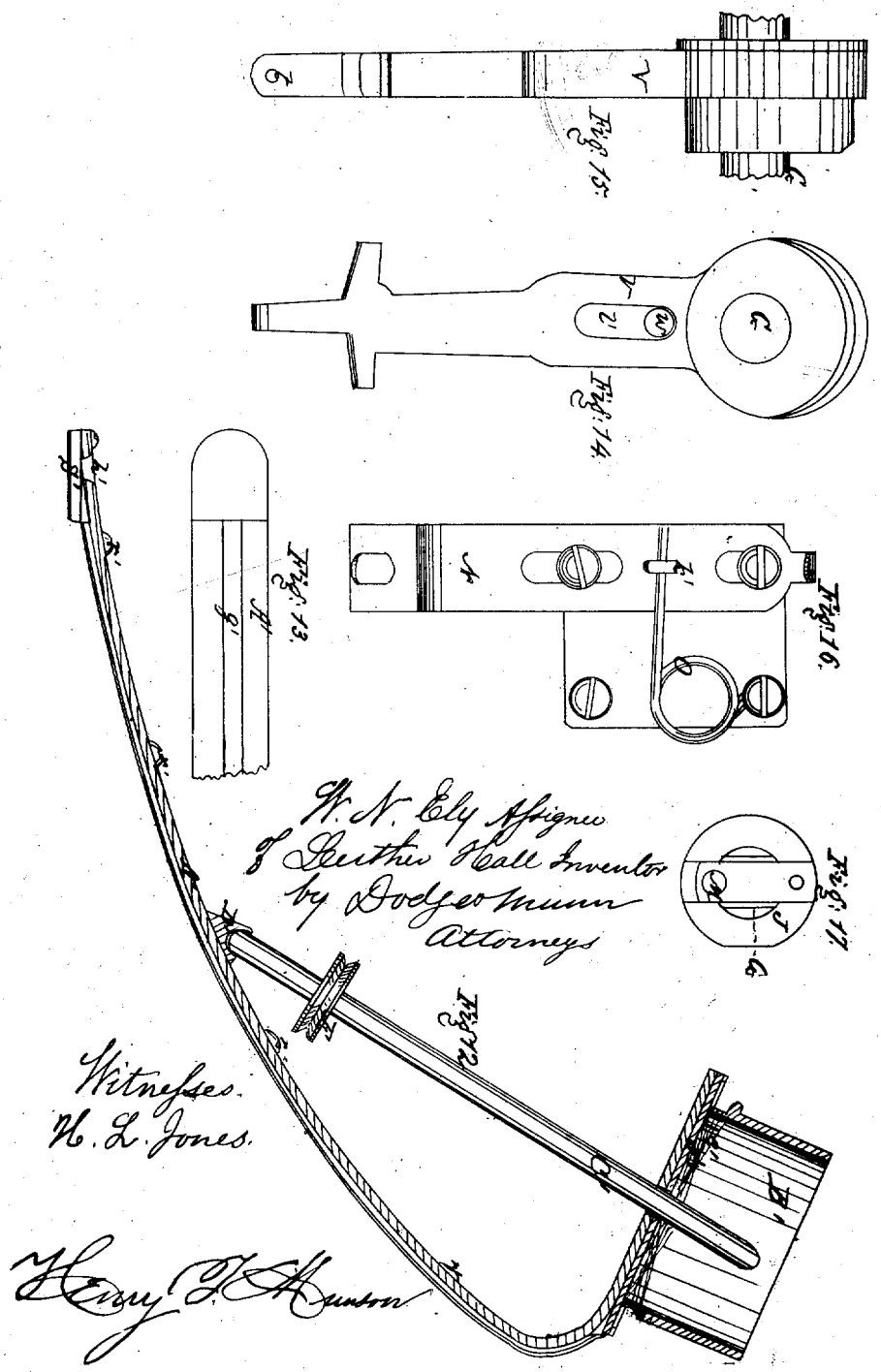
W. N. Ely Assignee
of Luther Hall Inventor
by Dodge & Munn
Attorneys
Witnesses.
H. L. Jones.
Henry C. Hanson

United States Patent Office.

WILLIAM N. ELY, OF STRATFORD, CONNECTICUT, ASSIGNEE, BY MESNE ASSIGNMENTS, OF LUTHER HALL.

*Letters Patent No.* 64,761, *dated May* 14, 1867; *reissue No.* 2,962, *dated June* 2, 1868.

DIVISION D.

IMPROVEMENT IN EYLETING-MACHINES.

The Schedule referred to in these Letters Patent and making part of the same.

TO ALL WHOM IT MAY CONCERN:

Be it known that LUTHER HALL, of Boston, in the county of Suffolk, and State of Massachusetts, has invented certain Improvements in Eyeleting-Machines; and I do hereby declare that the following is a full, clear, and exact description of the construction and operation of the same, reference being had to the accompanying drawings, forming a part of this specification, in which—

Figure 1:
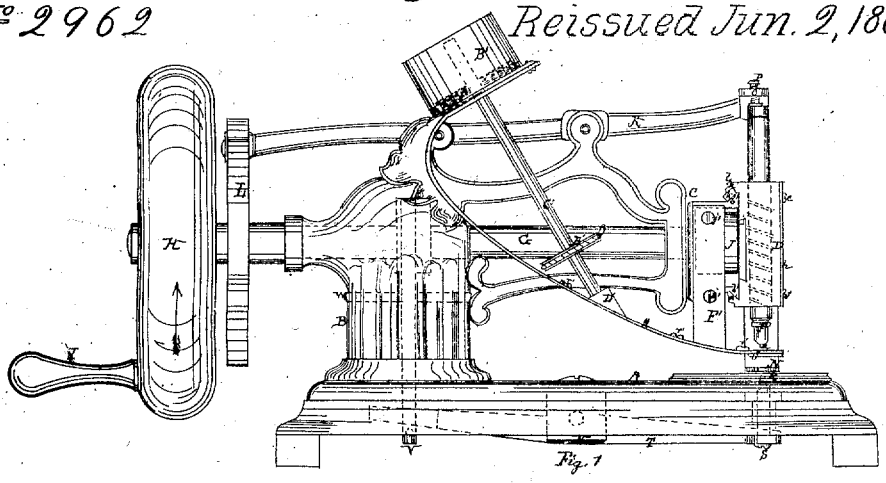

Figure 1 is a side elevation.

Figure 2:
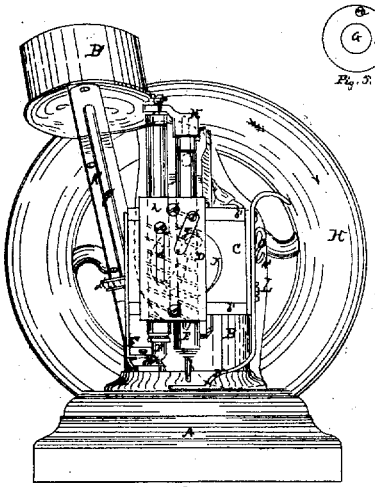

Figure 2, a front elevation.

Figure 3:
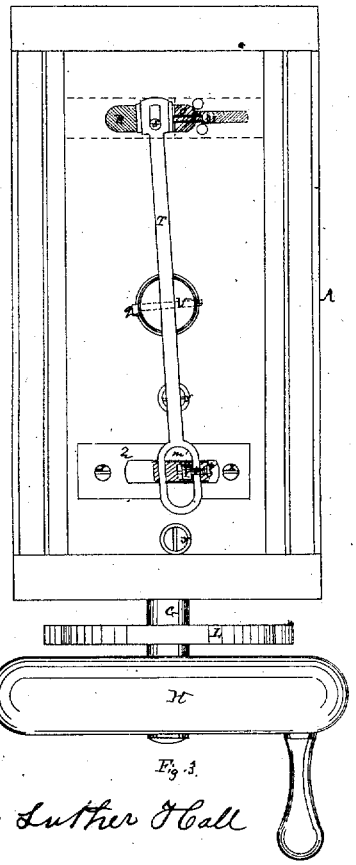

Figure 3, a plan of the under side of the machine.

Figure 4:
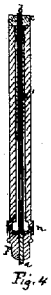

Figure 4, a longitudinal central section of the eyelet-set.

Figure 5:
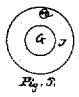

Figure 5, a front or end view of the driving-shaft and the eccentric-pin, by means of which a lateral reciprocating motion is given to the punch and set.

Figures 6, 7, 8:
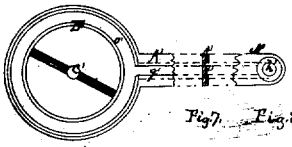

Figure 6, a top view of the eyelet-hopper.

Figure 7, a transverse section of the eyelet-conductor or chute.

~~Figure 8, a top view of the lower end of the chute.~~

Figure 10:
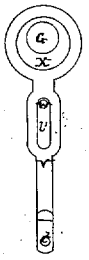
Figure 9:
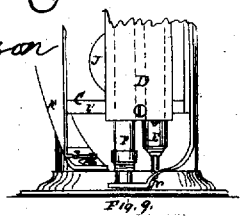
Figure 3:
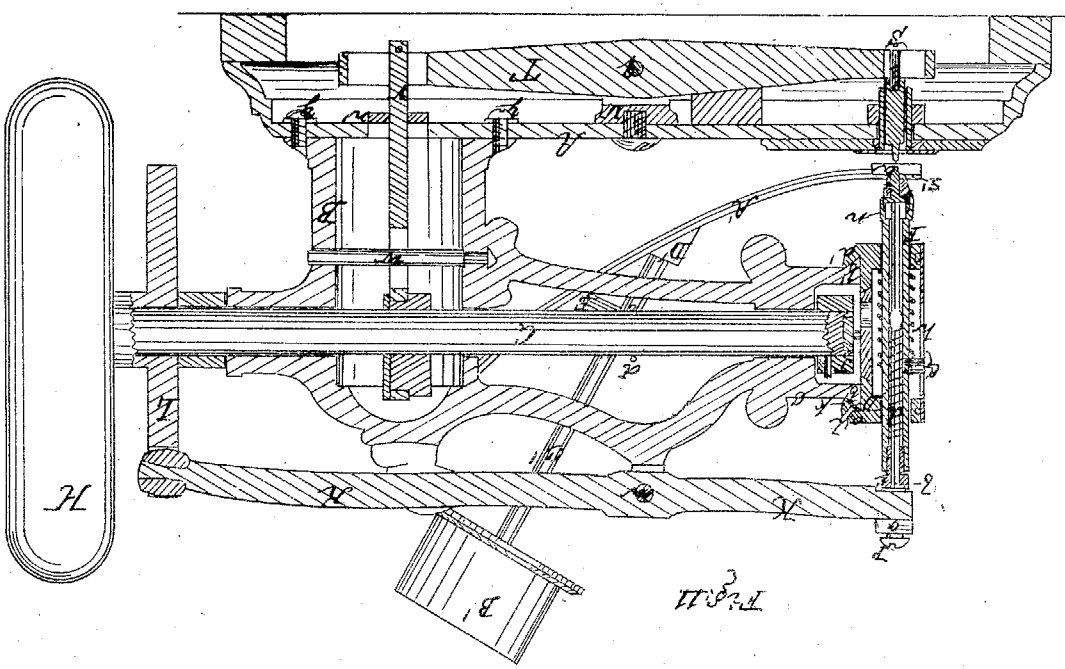

Figure 9, a front elevation of the punch and set, in the act of setting or heading down an eyelet; and Figure 10, a front view of the eccentric and lever, by means of which the required motions are given to the beds on which the holes are punched and the eyelets set.

Like parts are indicated by the same letters in all the drawings.

To enable others skilled in the art to make and use this invention, I will now proceed to describe the construction and operation of the same.

A is a metallic table or form, to the upper side of which is attached, by means of screws *y y*, (see fig. 3,) the hollow stud B, provided with the arm or continuation C, for the purposes hereinafter described.

D is a metallic box, the shape of which is shown in figs. 1 and 2, constituting the carrier of the punch and set. The top and bottom of the back of this carrier are provided with bevelled or dove-tailed continuations, *a′ a′*, which slide on corresponding ways *b′ b′*, *k* being a "gib," confined by set-screws *l*, as shown in fig. 1.

The front, *h*, of this carrier is removable, being confined by means of screws *i j*.

E is the punch, constructed like those in common use, with the exception of the top of the shaft, which (see dotted lines in fig. 2) is a screw, and may be raised or lowered as required, for the purpose of vertical adjustment. This punch, sliding in suitable bearings in the top and bottom of the carrier D, is thrown up by means of a spiral spring, *g*, the lower end of which rests on the inside of the lower plate of the carrier, and the upper end on a screw-stud, *f*, which is fast in the punch-shaft, and plays freely in the diagonal slot (see fig. 2) in the front piece *h*.

F is the eyelet-set or header, sliding freely in suitable bearings, in the top and bottom of the carrier D, being raised by means of the spiral spring *d*, the top of which bears against the screw *e*, which is fast in the set-shaft, and plays freely in a slot (see fig. 2) in the front, *h*, of the carrier. This set, as shown in fig. 4, is hollow, and its top and bottom are removable, the top being a screw, which may be raised or lowered so as to afford a vertical adjustment to the set.

*a* is a vertically-sliding steel pin, whose diameter should be a trifle larger than the smallest inside diameter of the eyelets to be used. The top of this pin *a* is provided with an enlarged head, *n*, which plays freely up and down in a chamber in the shaft, and limits the vertical movement of the pin *a*.

*b* is a round wire or pin, moving freely in the bore of the set, its lower end resting on the head of the pin *a*. These pins, *a* and *b*, are forced downward by means of a small spiral spring, *d′*, the bottom of which rests on an enlargement of the pin *b*, and the top on the bottom of the screw *e*.

G is the driving-shaft, which turns in suitable bearings in the stud B and front of the arm C, H being a fly-wheel, and I the handle, by which the machine is driven. Fast to the front of the shaft G is a disk, J, provided with an eccentric-pin, M, (see fig. 5,) which enters and plays freely in the S-shaped slot (see dotted lines, fig. 2) in the back of the carrier D, by means of which the requisite lateral movements are given to said carrier and its appendages.

K is a lever, which vibrates on the fulcrum *m* in the top of the arm C. The back end of this lever is provided with a friction-roller, *n'*, running on the periphery of the double cam L, which is fast to the shaft G, and shaped as shown in figs. 1 and 2. The front of the lever is shaped as shown in fig. 2, *o* being a raised step or continuation of the same, and designed to strike on the top of the eyelet-header F, as hereinafter described, *p* being an adjustable screw, by means of which the pin *a* (being acted upon thereby through the pin *b*) may be forced a less or greater distance into an eyelet, as may be required.

N is a pressure-foot, forced down by the spring O, by means of which the material to be eyeleted is held upon the top of the table A.

R is a strip of metal, the top of which is flush with the top of the table A, in which it slides freely in a bevelled groove, (see fig. 1.) Fast to the under side of this slide R is a hollow stud, represented by dotted lines in fig. 1, through which and said slide plays up and down the steel pin S, on the top of which, as a bed, the eyelets are set, there being a hole through the table to allow the requisite lateral motion to the said hollow stud.

T is a lever, the shape of which is clearly shown in figs. 1 and 3, vibrating on the fulcrum-pin *q*, in the short block or cylinder U, which also turns with freedom on a vertical axis of its own.

V (see fig. 10) is a lever, the upper end of which encircles the eccentric-wheel X fast to the driving-shaft G, inside of the hollow stud B, by means of which eccentric it is obvious that the lever V will be raised and lowered.

The lever V is also provided with a slot, *l'*, near its centre, through which passes a fulcrum-pin, W, (see figs. 1 and 10,) by means of which slot and pin it is also obvious that a lateral motion will be communicated to the lower portion of said lever. The lower end of the lever is also provided with shoulders, (see fig. 3,) which rest on the upper side of the lever T, and a head, which passes through the slot *m* in said lever T, *t* being a pin passed through said head, so as to bear on the under side of the lever T, and thereby raise the same. Thus it will be seen that the lever T, and consequently the pin S, will have imparted to them both a vertical and a horizontal motion, and for purposes hereinafter described.

Q (see fig. 3) is a slide, similar to R, on the top of which the eyelet-hole is punched, the point where the punch strikes being covered with copper or other material that will not dull the punch. The contiguous ends of the slides Q and R are kept together by means of a spring, *r*, one end of which is attached to R, and the other to the screw *n''*, projecting from Q.

*w* is a screw passing through the lever T, as shown in fig. 3, so that its point shall strike against the end of the vibrating-lever V, by means of which screw the lateral movement of the lever T, and consequently the pin or bed S, may be increased or diminished, according to the distance required between the eyelet-holes.

The apparatus by means of which the eyelets are conducted to the set or header F, consists of a hopper, B', agitator, *e'*, and chute A', or their equivalents. The hopper B', into which the eyelets to be used are promiscuously thrown, is a flat-bottomed cylindrical cup, of thin brass or other suitable material, supported on the upper end of the chute A', and at about the angle of inclination shown in fig. 1. The lower side of this cup or hopper B' is provided with a series of holes, *f'*, the bases of which are the bottom of the cup, said holes being of such a size and shape as to just allow eyelets, when resting on their flaring ends on the hopper-bottom, to pass freely through them, and thence into the chute or conductor A'. The holes *f'* being thus arranged and shaped, it is impossible for an eyelet to pass through them unless it shall be presented right side up, *i. e.*, resting on its flaring end, and so as to enter the chute in the proper position to be inserted in the eyelet-holes.

Outside of the cup B', and on the same plane with its bottom, is a flange, *o'*, (see fig. 6,) into which the eyelets pass immediately on leaving the holes *f*, and from which flange they slide or drop into the chute. In order to constantly bring some one or more of the eyelets in the hopper into the proper position to enter some one or more of the holes *f'*, it is necessary that they should be continually agitated or kept in motion, which may obviously be done by many equivalent mechanical devices. The drawings (figs. 1 and 2) represent this object as being accomplished by means of a rotating brush or arms, *e'*, attached to the shaft C', which passes through the centre of the hopper and into a step, D', on the top of the chute. This shaft C' is rotated by means of a band, *d'*, passing from the shaft G over a pulley, E', as shown in fig. 1.

The chute A is composed of three strips of metal, as shown in the transverse section, fig. 7, a broad top piece with two narrower pieces attached by screws or otherwise to its under side, the contiguous edges of the two under pieces being bevelled so as to reach over the flaring base of the eyelets, and thereby keep them from dropping out.

One of these under pieces may be adjusted laterally, if required, by means of the confining-screws *r'*, which pass through oblong slots in the upper piece, whereby the eyelet-groove *g'* may be accommodated to eyelets of different sizes. In the top piece of the chute, at the lower extremity, is a round hole, *h'*, of sufficient diameter to allow an eyelet to pass through it with freedom. Under this hole *h'*, and under the groove *g'*, is a thin metallic bottom, S', (see fig. 1,) to sustain the eyelet while the pin *a* is being forced into it.

The chute A' is held in place by the arm F', to which it is confined by means of a screw, as shown in fig. 2. This arm F' is attached to the arm C by the screws *j'* and *i'*, which are somewhat less in diameter than the holes through which they pass, so that the chute, with its appendages, may have imparted to it a slight vibration or shaking, every time an eyelet is picked out of the hole *h'* by the set F, for the purpose of agitating the eyelets in the groove *g'*, as well as in the hopper B', and thereby more effectually preventing them from clog- The operation of the machine is as follows: The eyelets to be set are poured promiscuously into the hopper B′, and the machine turned until the chute A′ is full of eyelets. The article to be eyeleted is now placed in the required position under the presser N and punch E. The punch and set being in the relative position shown in fig. 2, (the punch directly over the point where the hole is to be punched, and the header directly over the lowest eyelet in the hole *h′*,) the wheel H is now turned in the direction of the arrow, and until one of the wings of the cam-wheel L has reached its highest point, by means of which, through the action of lever K, the punch and set will be forced simultaneously downward, the punch through the material to be eyeleted, and the pin *a* into the eyelet in the hole *h′*, and thus a hole will be punched and an eyelet picked up, to be in turn set into it. The pin *a* may be changed, or otherwise constructed, so as to conform to eyelets of different sizes.

The wheel H is now turned further, and the back end of the lever K descends the first cam, when the punch and header will be thrown up by the spiral springs *d* and *g*, and the carrier D, with its appendages, will be moved horizontally by the eccentric-pin M, fig. 5, into the position shown in fig. 9, while at the same time the pin or bed S will also be moved so as to be directly under the set F.

The wheel H is now turned until the second cam of L has reached its highest point, which operation will have driven the set down on to the pin S, which in the mean time has risen up to meet it by the action of the eccentric, X, upon the lever T, and the eyelet is inserted into the punched hole, and set or headed down, the pin *a* being forced upward out of the way, and the top of the pin *b* into a hole (shown by dotted lines in fig. 2) in the end of the lever K.

The wheel H is now turned further, and the back of the lever K descends the second cam of L, when the header F is thrown up by the spring *d*, and the carrier D, with its appendages, is moved horizontally by the eccentric-pin M, into the position shown in fig. 2, while at the same time the pin or bed S moves horizontally, (the front end being still in the eyelet,) which will obviously carry or feed along the article to be eyeleted. The punch and set are now in the position first described, and ready to punch a new hole, and pick up another eyelet.

Thus the whole operation of punching the holes, feeding the eyelets, picking them up and carrying them to the place of insertion, inserting and heading them down, and feeding along the material to be eyeleted, is performed with great rapidity and precision. It is evident that the punch, instead of being a cutting-cylinder, may be made a solid rod, with a hole in the punching-table over which the material is placed, and through which the punched-out piece falls. The eyelets may also be fed down and received upon the top of the setting-bed.

What is claimed, therefore, and desired to be secured by Letters Patent in eyeleting-machines, substantially as described and for the purposes set forth, is—

1. The combination of movable carrier D with both punch E and set F, or either of them with lever K, constructed, arranged, and operating substantially as described.

2. The combination of movable carrier D with both punch E and set F, or either of them, lever K, and cam L, constructed, arranged, and operating substantially as described.

3. The combination of movable carrier D, set F, and setting-bed S, substantially as described.

4. The combination of movable carrier D, punch E, and sliding plate Q, substantially as described.

5. The combination of movable carrier D, punch E, set F, sliding plate Q, and bed S, substantially as described.

6. The movable carrier D, constructed, arranged, and operated substantially as described.

7. The combination of levers V and T and pin S, substantially as and for the purposes described.

8. The combination of plates Q and R, arranged and operated substantially as described.

9. The combination of levers V and T, pin S, and screw *w*, substantially as and for the purpose described.

10. The combination of lever T, block U, lever V, and eccentric-wheel X, constructed, arranged, and operating substantially as described.

11. The combination of hopper B′, chute A′, dish *h′*, and set F, substantially as described.

12. The combination of presser-foot N, spring O, with both punch E and set F, or either of them, and table A, substantially as described.

WILLIAM N. ELY.

Witnesses:
W. M. PARKER,
CHAS. W. FROST.